United States Patent [19]

Vassiliou

[11] Patent Number: 4,786,546
[45] Date of Patent: Nov. 22, 1988

[54] TWO LAYER POLYVINYL FLUORIDE COATINGS AND PROCESS FOR APPLYING IT

[75] Inventor: Eustathios Vassiliou, Newark, Del.

[73] Assignee: E. I. Du Pont de Nemours and Company, Wilmington, Del.

[21] Appl. No.: 112,077

[22] Filed: Oct. 26, 1987

Related U.S. Application Data

[63] Continuation-in-part of Ser. No. 867,159, May 27, 1986, abandoned.

[51] Int. Cl.⁴ .................. B32B 7/02; B32B 27/08
[52] U.S. Cl. ........................ 428/215; 427/385.5; 427/388.1; 427/407.1; 427/409; 428/216; 428/421; 525/378
[58] Field of Search .............. 428/421, 215, 216; 526/52.1; 427/407.1, 409, 385.5, 388.1

[56] References Cited

U.S. PATENT DOCUMENTS

| | | | |
|---|---|---|---|
| 3,133,854 | 5/1964 | Simms | 428/421 |
| 3,257,266 | 6/1966 | Sapper | 428/421 |
| 4,158,725 | 6/1979 | Nishimura et al. | 526/52.1 |
| 4,314,004 | 2/1982 | Stoneberg | 428/421 |
| 4,557,977 | 12/1985 | Memmer et al. | 428/421 |

*Primary Examiner*—Thomas J. Herbert

[57] ABSTRACT

A composite comprising a substrate, a primer layer and a topcoat layer is disclosed. The primer comprises 20-40 weight percent of an acrylic copolymer containing 1-20 weight percent repeating units of the structure

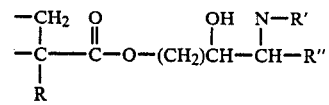

or

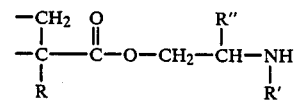

where n is 1-6, —R is —H or —CH₃, R' is —H, —CH₃ or —(CH₂)$_m$CH₃ where m is 1-5, and —R" is —H, —CH₃ or —(CH₂)$_x$CH₃ where x is 1-5, from 65-99 weight percent repeating units of the structure

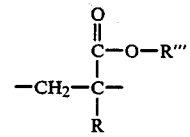

where —R''' is —H, —CH₃ or —(CH₂)$_y$—CH₃ where y is 1-17 and up to 15 weight percent repeating units of the structure

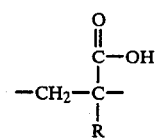

and 80-60 weight percent polyvinyl fluoride. The topcoat is polyvinyl fluoride. The primer layer is 0.1-0.5 mil in thickness and the topcoat is 0.1-30 mils in thickness. The coatings are applied wet on wet and then baked.

2 Claims, No Drawings

TWO LAYER POLYVINYL FLUORIDE COATINGS AND PROCESS FOR APPLYING IT

CROSS-REFERENCE TO RELATED APPLICATION

This application is a continuation-in-part of Ser. No. 867,159, filed May 27, 1986, and now abandoned.

BACKGROUND OF THE INVENTION

1. Field of the Invention

The present invention relates to a polyvinyl fluoride coating in which a blend of polyvinyl fluoride and a modified acrylic copolymer are used as a primer and polyvinyl fluoride as a top coat. The two layers are applied wet on wet and then baked.

2. Prior Art

U.S. Pat. No. 3,133,854 discloses adhereing polyvinyl fluoride films to substrates using an acrylic copolymer containing aminated pendant epoxy groups.

U.S. Pat. No. 3,257,266 discloses adhering polyvinyl fluoride films to substrates using various adhesives including an aminated copolymer of methyl methacrylate and glycidyl methacrylate.

U.S. Pat. No. 4,158,725 discloses adhering polyvinyl fluoride films to substrates using an acrylic copolymer having aminated pendant expoxy groups as the adhesive.

U.S. Pat. No. 4,314,004 discloses applying a pigmented blend of a fluorocarbon resin and an acrylic resin to a substrate followed by application of a clear coat of a blend of fluorocarbon resin and an acrylic resin.

U.S. Pat. No. 4,557,977 discloses applying a primer to a substrate which primer comprises a fluorocarbon resin, an acrylic resin and a flow modifier followed by application of a fluorocarbon topcoat.

SUMMARY OF THE INVENTION

The present invention relates to a two layer coating system in which a primer which is a blend of a copolymer of methyl methacrylate and a methyacrylate having a pendant epoxy group such as glycidyl methacrylate wherein the epoxy group of the glycidyl methacrylate has been reacted with ammonia or methylamine to create pendant beta-hydroxy amine groups or of a copolymer of methyl methacrylate and a methacrylate having a pendant carboxyl group wherein the carboxyl group has been reacted with an imine to create pendant amine groups, and polyvinyl fluoride is first applied to a substrate followed by application of a layer of a dispersion of polyvinyl fluoride. The two layers are applied wet on wet and then baked.

DETAILED DESCRIPTION

The prime coating is a dispersion of 60-80 weight percent, based on total polymer present of polyvinyl fluoride and 20-40 weight percent, based on total polymer present, of an acrylic copolymer. The acrylic copolymer should comprise from 20-40, and preferably 25-30 weight percent of the total polymer present, because below 20 weight prcent the adhesion is inadequate and above 40 weight percent wrinkling of the topcoat occurs. Generally the primer will contain from 10-50 weight percent solids and the remainder a solvent for the two polymers. This solvent will be a solvent at room temperature for the acrylic polymer, and a latent solvent for polyvinyl fluoride. The acrylic polymer in the primer contains 1-20 weight percent repeating units of the structure

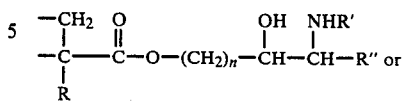

or

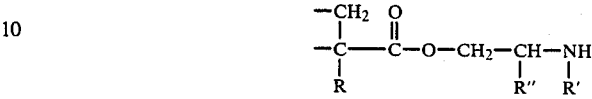

where n is 1-6, —R is —H, or —CH$_3$, —R' is —H, —CH$_3$ or —(CH$_2$)$_m$—CH$_3$ where m is 1-5 and —R" is —H, —CH$_3$ or —(CH$_2$)$_x$—CH$_3$ where X is 1-5 and 65-99 weight percent repeating units of the structure

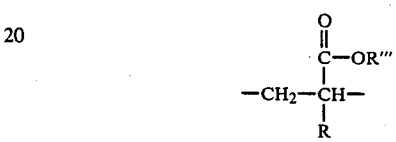

where —R is —H or CH$_3$ and —R''', is —H, —CH$_3$ or —CH$_2$)$_y$—CH$_3$ where y is 1-17. Optimally, the acrylic polymer can contain up to 15 weight percent repeating units derived from acrylic acid or methacrylic acid. The solvents used are polar organic compounds or mixtures of polar and non-polar compounds, where the polar compound is a latent solvent of polyvinyl fluoride and it is in excess of 30% by weight of the total solvents. It is preferred that the same polar solvent is used in the composition of the topcoat, and it boils at 100°-300° C. Preferably the primer on drying should be from 0.1-0.5 mils ($2.5 \times 10^{-6}$ to $12.5 \times 10^{-6}$M).

Organic liquids which have no appreciable action on polyvinyl fluoride at room temperature, but solvate it at higher temperatures, are called latent solvents. When a latent solvent has a high enough boiling point to remain in the composition after baking, it may also act as a plasticizer. For most applications, polyvinyl fluoride possesses adequate toughness and it does not require the presence of plasticizers, in contrast with polyvinyl chloride, which is used almost exclusively in the plasticized form. The use of latent solvents, however, is absolutely necessary in coalescing particles of polyvinyl fluoride for producing clear films. Although there are sharply distinguishable non-solvents, the baking conditions may be such that allow the latent solvent to evaporate before the solvation (point of gellation) gets a chance to take place. Thus, care should be exercized to avoid mistaking a latent solvent as a non-solvent in such occasions. Examples of latent solvents for polyvinyl fluoride are butyrolactone, methylformamide, dimethylformamide, methlacetamide, dimethylacetamide, dimethylhydroxyacetamide, diacetone alcohol, acetonyl acetone, tetramethyl urea, cyclic ethylene carbonate, cyclic propylene carbonate, pyridine, triethyl phosphate, tributyl phosphate, triphenyl phosphite, N,N,-dimethyl-hydroxybutyramide, butadiene, cyclic sulfone, N-methylpyrrolidone, acetophenone, acetyl triethyl citrate, aniline, n-butyl levulinate, diallyl phthalate, dibenzyl ether, dibutyl fumarate, di-n-butyl maleate, dibutyl phthalate, di-n-butyl succinate, dibutyl tartrate, di(2-ethyl hexyl) phthalate, diethyl maleate, diethyl phthalate, diethyl sebacate, dimethyl adipate, dimethyl phthalate, dioctyl adipate, ethyl levulinate, isophorone, quinoline, Texanol isobutyrate, o-toluidine, triacetin, tributyl citrate, triethyl citrate, Aroclor* 1121 and 1232 (Monsanto Chemical Co.), as well as Santicizer* E-15, M-17, and −8 (Monsanto Chemical Co.).

The topcoat used herein is polyvinyl fluoride. The polyvinyl fluoride is applied as a dispersion in an organic solvent having a boiling point of from 100°–300° C. Generally the dispersion will contain from 10-50 weight percent polyvinyl fluoride with from 20-35 weight percent being preferred. Generally the topcoat should be from 0.1–20.0 mils ($2.5 \times 10^{-6}$ to $7.6 \times 10^{-6}$m) with 0.5-5 mils being preferred. The thicker topcoats tend to cause delamination of the coating when exposed to water.

The primer and topcoat are applied to a substrate wet on wet and then baked at 250°–500° C., preferably 350°–450° C. for 5-60 minutes.

Suitable substrates include aluminum, steel, tin coated steel, galvanized steel, brass, zinc alloys, etc.

The primer can be applied either as a clear or pigmented film. Pigmentation, when required may include conventional inorganic and/or organic pigments including but not limited to titanium dioxide, silica, talc, mica, metal carbonates, metal sulphates, chromates, phospho silicate composites, boro silicate composites, calcium silicate composites, aluminum triphosphates, zinc phospho oxides, barium metabarate, zinc molybdate and other nonconventional pigments including synthetic pigments such as plastic pigments, polystyrene and the like. Thus a pigmented coating may contain a pigment to binder ratio of 0.005–1.5, but preferably from 0.5–1.0.

Minor levels of other conventional additives can be included in the primer or topcoat such as for example stabilizers, suspending and coalescing agents, lubricants, ultraviolet light absorbers, plasticizers, surfactants, defoamers and the like.

EXAMPLES

EXAMPLE I

A series of aluminum test panels with 1200S treatment,(Proprietary treatment made by AMCHEM PRODUCTS, INC.), were coated with the blend of polymer A and polymer B indicated in Table I. The blend was applied using a #30 rod to give a coating thickness of 0.2–0.3 mil ($0.5–0.75 \times 10^{-5}$ m) upon baking. A polymer B topcoat was applied using a #70 rod wrapped on each side with three layers of tape to increase the thickness of the coating to 2-3 mils ($5–7.5 \times 10^{-5}$ m) upon baking. The two coats were applied wet on wet. They were baked at 400° F. (204° C.) for 5 minutes in a solvent-rich atmosphere and 1 additional minute in air. The panels were cut into ½" (0.0127 m) wide strips. One set of strips was not further treated. Another set of strips was boiled in water for 1 hour. A third set of strips was boiled in water for 4 hours and left in water over a weekend.

The peel adhesion was measured on these samples at very low speed. Where the topcoat broke, before adhesion failure, the force was expressed as ">" (greater than).

Polymer A was a solution containing 30% solids of a coplymer of 98 weight percent methyl methacrylate and 2 weight percent glycidyl methacrylate wherein the epoxy groups of the glycidyl methacrylate had been reacted with ammonia after polymerization. This was then diluted with an equal volume of propylene carbonate and mixed with polymer B to give the percent polymer A solids reported in Table I. Polymer B was a 33% solids dispersion of polyvinyl fluoride in propylene carbonate. The polymer B dispersion was milled in a sand mill for ½ hour prior to use. The charge to the sand mill was 600 g of dispersion and 800 g of sand.

TABLE I

| Primer Polymer A Solids % | Peel Strength | | |
|---|---|---|---|
| | Dry lbs/inch | Boil 1 Hour lbs/inch | Boil 4 Hours lbs/inch |
| 0 | > | 0 | 0 |
| 10 | >10 | 0 | 8 |
| 20 | >9 | 1.5 | >8 |
| 30 | >8 | >4 | >4 |
| 40 | >8 | >4 | 4 |
| 50 | >8 | | |
| 60 | >8 | 2 | |
| 70 | >10 | >9 | >5 |
| 80 | >10 | 10,11 | 2 |
| 90 | >11 | 11 | 5 |
| 100 | >8 | 10 | >8 |

This shows that the primer should contain at least about 20% based on solids polymer A type resin.

EXAMPLE II

One aluminum can was cut open and the bottom removed. It was then subjected to about 1000 psi ($6.9 \times 10^6$ Pa) at 210° C. for between ½ and 1 hour to render it straight. The can was coated on ½ its length with a primer made up of 146.4 g a solution of solids solution copolymer of 98 weight percent methyl methacrylate and 2% glycidyl methacrylate wherein the epoxy groups of the glycidyl methacrylate had been reacted with ammonia after polymerization, dissolved in toluene, 351.0 g propylene carbonate and 02.6 g of polyvinyl fluoride. The 600 g of primer was ground in a mill with 800 g of sand and filtered prior to use. The can was coated on ½ its length with the primer using a #30 rod and then a topcoat of the solution of polymer B used in Example 1 was applied wet on wet using a #8 rod to which three layers of tape had been applied to the whole length of the can. This was baked at 450° F. (232° C.) for 5 minutes. The panel was cut in half lengthwise. One-half was immersed in water overnight and the other half kept as a control. The water tested panel lost its adhesion in all of the unprimed areas and in the primed areas where the topcoat was thickest.

I claim:

1. A composite comprising a substrate, intimately adhered to said substrate a layer from 0.1–0.5 mil in thickness of a polymeric composition comprising 20-40 weight percent of an acrylic copolymer containing 1–20 weight percent repeating units of the structure

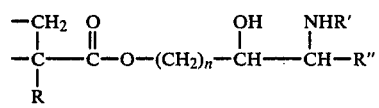

or

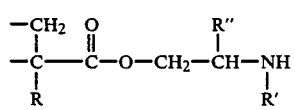

where n is 1-6, —R is —H or —CH$_3$, —R' is —H, —CH$_3$ or —(CH$_2$)$_m$—CH$_3$ where m is 1-5, and —R" is —H, —CH$_3$ or (CH$_2$)$_x$CH$_3$ where x is 1-5, 65-99 weight percent repeating units of the structure

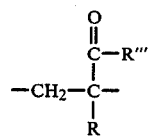

where R''' is —H, —CH$_3$ or —(CH$_2$)$_y$CH$_3$ where y is 1-17 and 0-15 weight percent repeating units of the structure

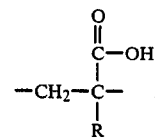

and 80-60 weight percent of polyvinyl fluoride having topcoat from 0.1-30 mils in thickness which consists essentially of polyvinyl fluoride.

2. The composite of claim 1 wherein the topcoat is from 0.5-5 mils in thickness.

* * * * *